(12) United States Patent
Czopek et al.

(10) Patent No.: US 8,505,990 B2
(45) Date of Patent: Aug. 13, 2013

(54) CORNER ENERGY ABSORBER AND BUMPER SYSTEM

(75) Inventors: Brian Joseph Czopek, Macomb Township, MI (US); Eric Jon Jaarda, Milan, MI (US); Eric D. Kowal, Macomb, MI (US)

(73) Assignee: Sabic Innovative Plastics IP B.V. (NL)

( * ) Notice: Subject to any disclaimer, the term of this patent is extended or adjusted under 35 U.S.C. 154(b) by 1269 days.

(21) Appl. No.: 11/963,177

(22) Filed: Dec. 21, 2007

(65) Prior Publication Data

US 2009/0160204 A1    Jun. 25, 2009

(51) Int. Cl.
*B60R 19/18*    (2006.01)

(52) U.S. Cl.
USPC ............ 293/102; 293/133; 293/149; 293/154

(58) Field of Classification Search
USPC ................. 293/102, 120, 132, 133, 154, 149, 293/150
See application file for complete search history.

(56) References Cited

U.S. PATENT DOCUMENTS

| | | | |
|---|---|---|---|
| 4,061,386 A | 12/1977 | Chupick | |
| 4,168,855 A * | 9/1979 | Koch | 293/115 |
| 4,533,166 A | 8/1985 | Stokes | |
| 4,998,761 A * | 3/1991 | Bayer et al. | 293/121 |
| 5,150,935 A | 9/1992 | Glance | |
| 5,407,239 A * | 4/1995 | Arai et al. | 293/146 |
| 5,425,561 A * | 6/1995 | Morgan | 293/120 |
| 5,462,325 A * | 10/1995 | Masuda et al. | 293/102 |
| 5,997,057 A * | 12/1999 | Gasko et al. | 293/102 |
| 6,042,163 A * | 3/2000 | Reiffer | 293/155 |
| 6,082,792 A | 7/2000 | Evans et al. | |
| 6,179,353 B1 * | 1/2001 | Heatherington et al. | 293/122 |
| 6,219,980 B1 | 4/2001 | Peck, Jr. | |
| 6,318,775 B1 * | 11/2001 | Heatherington et al. | 293/120 |
| 6,357,816 B1 * | 3/2002 | Porter | 296/102 |
| 6,406,081 B1 * | 6/2002 | Mahfet et al. | 293/133 |
| 6,609,740 B2 * | 8/2003 | Evans | 293/121 |
| 6,644,701 B2 * | 11/2003 | Weissenborn et al. | 293/120 |
| 6,663,150 B1 * | 12/2003 | Evans | 293/120 |
| 6,669,251 B2 | 12/2003 | Trappe | |
| 6,672,635 B2 * | 1/2004 | Weissenborn et al. | 293/120 |
| 6,685,243 B1 | 2/2004 | Evans | |
| 6,695,368 B1 | 2/2004 | Weykamp | |
| 6,726,262 B2 | 4/2004 | Marijnissen et al. | |

(Continued)

FOREIGN PATENT DOCUMENTS

| | | |
|---|---|---|
| EP | 0249518 | 12/1987 |
| EP | 836032 | 2/2004 |
| GB | 1033417 | 6/1966 |
| JP | 57198142 | 12/1982 |

*Primary Examiner* — Glenn Dayoan
*Assistant Examiner* — Gregory Blankenship
(74) *Attorney, Agent, or Firm* — Cantor Colburn LLP

(57) ABSTRACT

The present invention provides for various embodiments of a corner energy absorber. In one embodiment the corner energy absorber includes a body portion and an arm portion. The body portion comprises a top surface, a bottom surface and a front wall that extends from the top surface to the bottom surface. The corner energy absorber further includes a crush member extending from the front wall of the body portion between the top surface and the bottom surface of the body portion. In another embodiment, at least one of the body portion and the arm portion comprises an attachment feature. The invention also provides for various embodiments of a bumper system comprising a corner energy absorber connected to a bumper beam.

21 Claims, 4 Drawing Sheets

(56) References Cited

U.S. PATENT DOCUMENTS

| | | | |
|---|---|---|---|
| 6,767,502 B2 * | 7/2004 | Porter | 264/572 |
| 6,817,638 B1 * | 11/2004 | Choi et al. | 293/109 |
| 6,846,026 B2 * | 1/2005 | Detwiler et al. | 293/102 |
| 6,866,313 B2 | 3/2005 | Mooijman et al. | |
| 6,886,873 B2 * | 5/2005 | Weykamp et al. | 293/133 |
| 6,997,490 B2 | 2/2006 | Evans et al. | |
| 7,044,515 B2 | 5/2006 | Mooijman et al. | |
| 7,044,516 B2 * | 5/2006 | Kobayashi et al. | 293/146 |
| 7,073,831 B2 | 7/2006 | Evans | |
| 7,080,862 B2 * | 7/2006 | Suzuki et al. | 293/154 |
| 7,131,674 B2 | 11/2006 | Evans et al. | |
| 7,134,700 B2 | 11/2006 | Evans | |
| 7,163,243 B2 | 1/2007 | Evans | |
| 7,278,667 B2 | 10/2007 | Mohapatra et al. | |
| 7,296,833 B2 | 11/2007 | Mohapatra et al. | |
| 7,427,090 B2 * | 9/2008 | Hodoya et al. | 293/102 |
| 7,559,589 B2 * | 7/2009 | Nees | 293/154 |
| 2003/0132640 A1 | 7/2003 | Weissenborn et al. | |
| 2003/0155782 A1 | 8/2003 | Iino | |
| 2003/0173787 A1 | 9/2003 | Zipfel | |
| 2003/0227183 A1 | 12/2003 | Weissenborn et al. | |
| 2003/0227184 A1 | 12/2003 | Evans | |
| 2004/0262588 A1 | 12/2004 | Bronstad | |
| 2005/0213478 A1 | 9/2005 | Glasgow et al. | |
| 2005/0236850 A1 | 10/2005 | Evans et al. | |
| 2006/0046021 A1 | 3/2006 | Morris | |
| 2006/0181090 A1 | 8/2006 | Boivin et al. | |
| 2006/0255602 A1 | 11/2006 | Evans | |
| 2007/0085230 A1 | 4/2007 | Weissenborn et al. | |
| 2007/0200376 A1 | 8/2007 | Jaarda et al. | |
| 2008/0001416 A1 | 1/2008 | Chaudhari et al. | |
| 2008/0315597 A1 * | 12/2008 | Ichikawa et al. | 293/102 |
| 2010/0102578 A1 * | 4/2010 | Nilsson | 293/102 |

\* cited by examiner

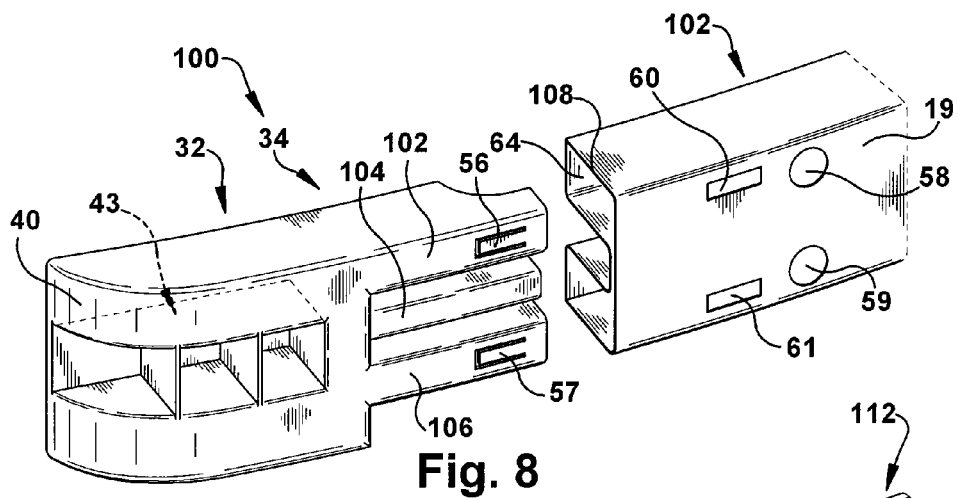
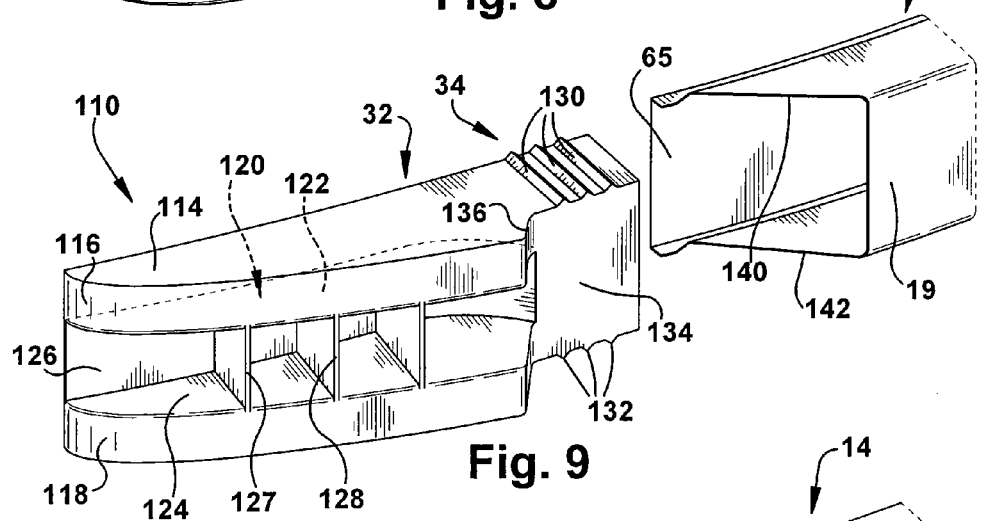
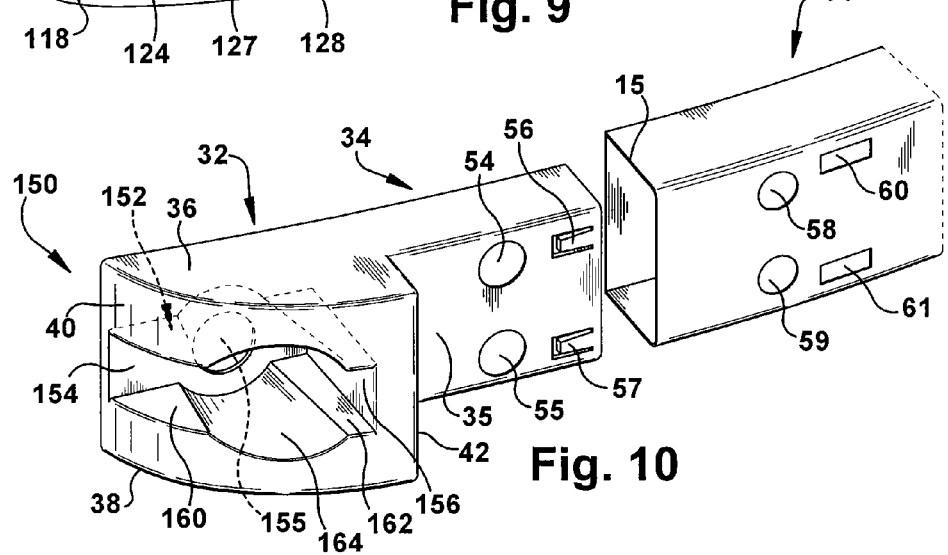

CORNER ENERGY ABSORBER AND BUMPER SYSTEM

FIELD OF THE INVENTION

The present invention relates to energy absorbers. More specifically, the present invention relates to energy absorbers for the exterior of vehicles and energy absorbing vehicle bumper systems.

BACKGROUND OF THE INVENTION

The use of structures in bumper systems for absorbing energy is known. Bumper systems typically extend with width size across the front and rear of a vehicle and are mounted to side rails that extend in a lengthwise direction. The typical bumper system includes a steel beam or reinforcing member attached to vehicle side rails and covered by a fascia.

Energy absorbing systems attempt to reduce vehicle damage as a result of a collision by managing impact energy absorption. Federal Motor Vehicle Safety Standards (FMVSS) typically require that the bumper beams extend beyond the side rails in order to protect the vehicle during corner impact tests. In addition, the Insurance Institute for Higher Safety (IIHS) has developed a 15% bumper offset test protocol for low speed impact.

Some vehicles have incorporated a small end cap at opposite ends of the bumper beam to support the size of the fascia as it extends around the body of the vehicle. These end caps do not perform any significant crash resistance. Also, material such as foam has been added to the ends of the bumper beam to support the fascia during impact. However, these materials typically only take up space and do not provide any substantial crash resistance improvement. Therefore, there is a need to improve the crash integrity of the corners where the bumper is connected to the side rails.

SUMMARY OF THE INVENTION

The present invention provides for various embodiments of a corner energy absorber that improves corner protection and energy management for existing passenger car bumper systems. In one embodiment of the present invention, a corner energy absorber provides a body portion including a top surface and a bottom surface and a front wall that extends between the top surface and the bottom surface. The corner energy absorber also includes an aim portion that can be inserted into the end of the bumper beam. Body portion further includes a crush member or at least one crush member that extends from the front wall and is disposed between the top surface and the bottom surface of the body portion of the energy absorber. In another embodiment, at least one of the body portion and the arm portion of the corner energy absorber further includes a connection feature which allows the corner energy absorber to be connected to another component of a bumper system. The corner energy absorber manages impact forces outside the current impact zone of existing steel or aluminum bumper beams. The various embodiments described herein allow for a multiple attachment methods between the corner energy absorber and the bumper beam.

The present invention also provides for a bumper system that includes a bumper beam two corner energy absorbers attached to opposite ends of the bumper beam. The bumper system can further include a second energy absorber that extends along the bumper beam and between the corner energy absorbers. The bumper system can also include a fascia that at least partially encloses the bumper beam and corner energy absorbers.

BRIEF DESCRIPTION OF THE DRAWINGS

The various embodiments of the present invention can be understood by the following drawings and figures. The components are not necessarily to scale.

FIG. 8 is a perspective view of a corner energy absorber having an plurality of channels and a C-shaped bumper beam, according to an embodiment of the present invention;

FIG. 9 is a perspective view of a corner energy absorber having an elongated body portion and an arm portion having protrusions which are inserted into a bumper beam, according to another embodiment of the present invention; and FIG. 10 is a perspective view of a corner energy absorber having a body portion that includes a crush member with an integrated attachment feature according to an alternative embodiment of the present invention.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

Figure 1:
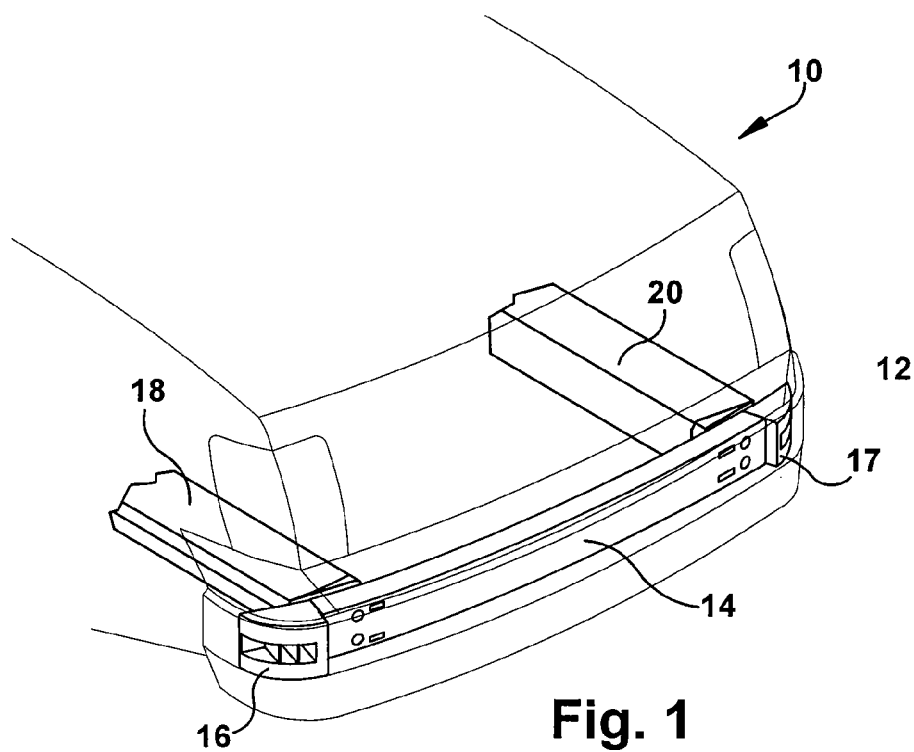
FIG. 1 is a perspective view of a vehicle showing a bumper system having a corner energy absorber, according to an embodiment of a present invention.

FIG. 1 shows a perspective view of a front portion of a vehicle 10 having a bumper system 12 according to an embodiment of the invention, bumper system 12 includes bumper beam 14 having a corner energy absorber 16 and 17 in which the bumper beam is mounted to the side rails 18 and 20 of vehicle 10.

Figure 2:
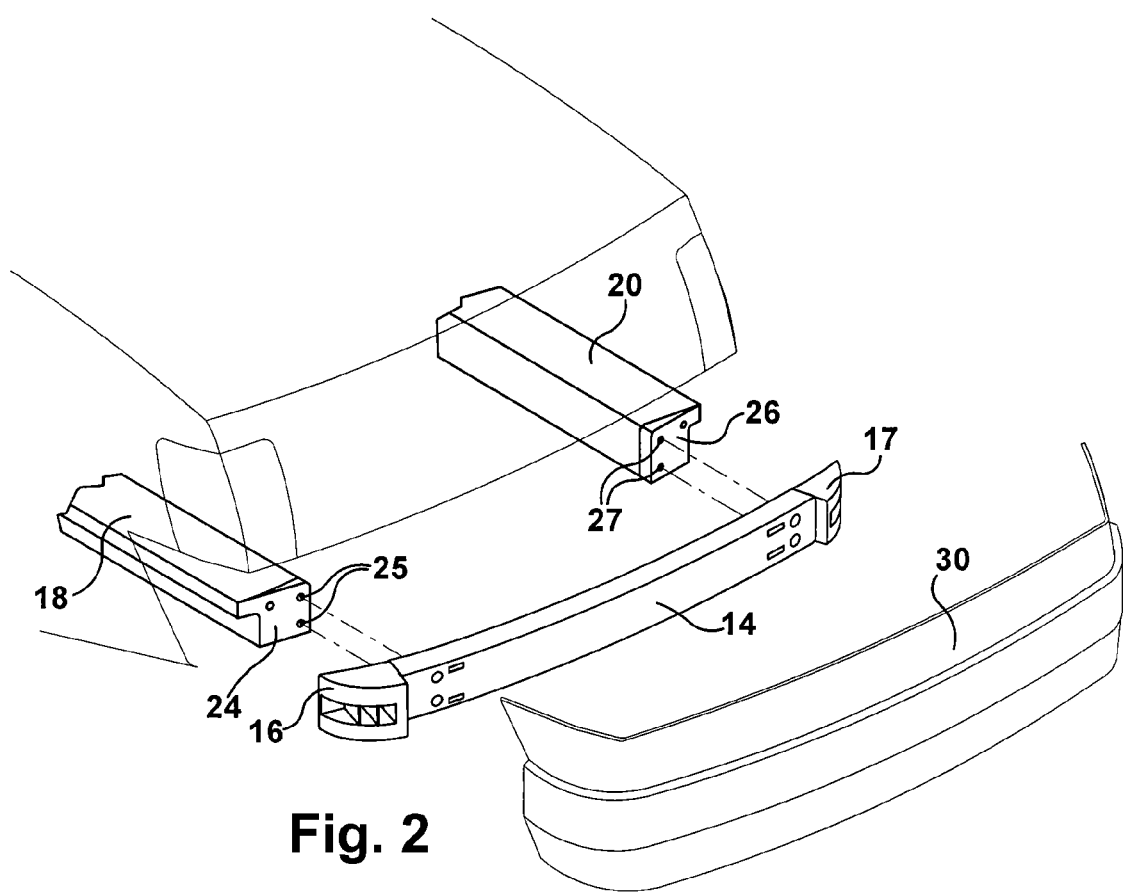
FIG. 2 is an exploded view of the bumper system of FIG. 1 showing the components of the bumper system, according to an embodiment of the present invention.

FIG. 2 is a perspective view of front portion of vehicle 10 showing the connection of the bumper beam 14 attached to side rails 18 and 20. Bumper beam 14 attaches to mounting plates 24 and 26, for example using fasteners that mount the bumper beam 14 to receptors 25 and 27 of mounting plates 24 and 26, respectively. Corner energy absorbers 16 and 17 extend from the miter end of the bumper beam 14. Fascia 30 is designed to integrate the bumper assembly with the vehicle body, while also improving aerodynamics to substantially reduce the wind resistance of the vehicle.

Figure 3:
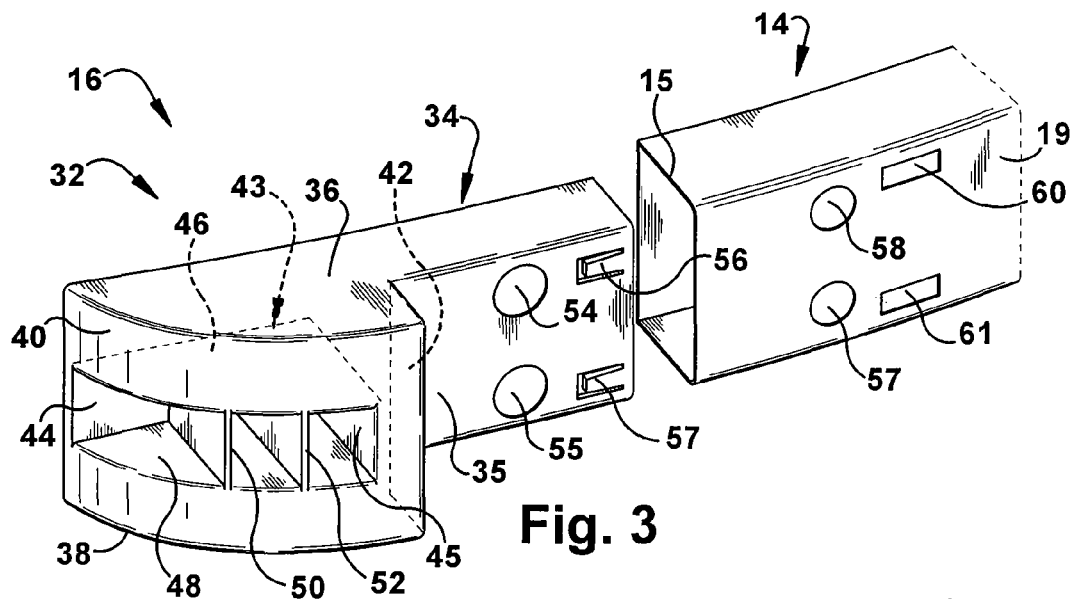
FIG. 3 is a perspective schematic diagram of a corner energy absorber including a body portion an arm portion and a bumper beam, according to an embodiment of the present invention.

FIG. 3 is a perspective schematic view of a corner energy absorber 16 that includes a body portion 32 and an arm portion 34, according to an embodiment of the present invention. Corner energy absorber 16 is configured to facilitate attachment to bumper beam 14. For example, walls of arm portion 34 can be tapered from the body portion to the arm portion to allow the corner energy absorber 16 to be easily inserted into bumper beam 14.

Body portion 32 includes a top surface 36, a bottom surface 38 and a front wall 40 that extends between the top and bottom surface. A corner energy absorber also includes an arm portion 34 that extends from the body portion 36 for insertion into the bumper beam 14. The body portion includes a crush member 43 that extends inwardly from the front wall 40 of the body portion. In one embodiment the crush member 43 includes a rear wall 44, a side wall 45, a top wall 46 and a bottom wall 48 which extend from rear wall 44. Rear wall 44 of crush member can be the rear wall of corner energy absorber 16. As shown, top and bottom walls 46 and 48, respectively, extend between rear wall 44 and optional side wall 45. In another embodiment, the crush member 43 further includes a plurality of ribs, for example, ribs 50 and 52, which extend between top wall 46 and bottom wall 48 of crush member 43.

Crush member 43 defines at least one opening or hollow sections in the corner energy absorber that are adapted for controlled collapse upon impact for absorbing. A plurality of ribs are adapted for controlling the collapse of hollow sections and stretch upon impact for additional energy absorption. Ribs may extend in a longitude direction between the top and base of the corner energy absorber. Additionally, ribs may extend transverse to the longitude direction, thereby extending from the rear wall 44 to a side wall 45, or from a wall to a rib or a rib to a rib, for example, of the corner energy absorber.

Front wall 35 of arm portion 34 can include one or more attachment features for connecting the corner energy absorber to the bumper beam. In the example embodiment, front wall 35 of arm portion 34 includes attachment features such as clearance holes 54 and 55 for proper bumper assembly to the body of the vehicle. The corner energy absorber 16 is inserted into the end 15 of D-section bumper beam 14 and attached using a flex tab or snap connect feature of the corner energy absorber. Arm portion 34 of the corner energy absorber includes flex tabs 56 and 57 which are naturally outwardly biased to extend into the openings 60 and 61 of the bumper beam 14 when they are brought into alignment. Clearance holes 58 and 59 of bumper beam 14 are then aligned with the clearance holes 54 and 55 of the corner energy absorber so that the assembly of bumper beam and corner energy absorber can be mounted to the mounting plates of a vehicle for example, mounting plate 25 (FIG. 2).

Often the bumper beam is shipped from the factory separate from the vehicle and attached to the vehicle at a later time. The corner energy absorber can be attached onto the bumper beam 14 in an assembly step prior to the bumper beam being attached to the vehicle.

Figure 4:
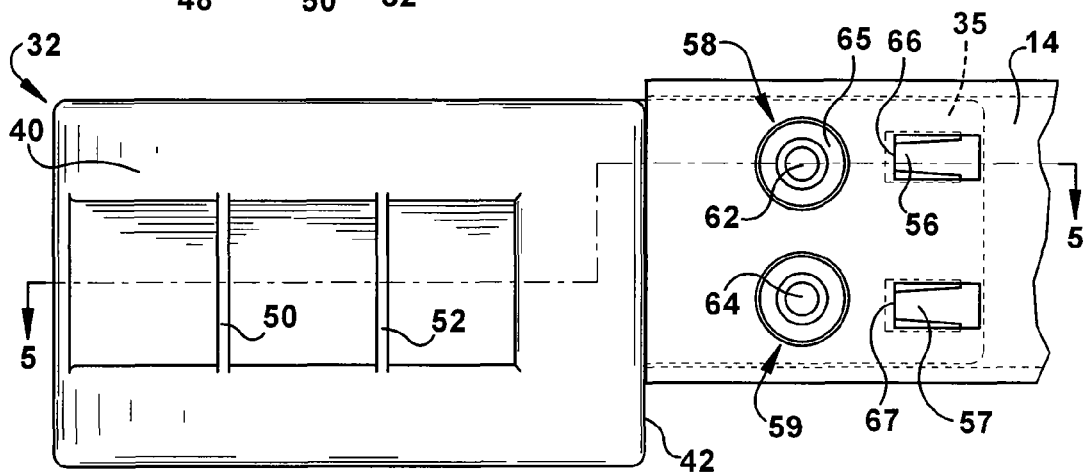
FIG. 4 is a front view of the corner energy absorber shown in FIG. 3 showing the corner energy absorber attached to a bumper beam, according to the embodiment of the present invention.

FIG. 4 is a front view of the corner energy absorber 16 of FIG. 3 showing the arm portion of the corner energy absorber after it has been inserted into the bumper beam. Flex tab 56 and 57 are balanced against walls' edges 56 and 57 of openings 60 and 61 of the bumper beam. The clearance holes 58 and 59 align with openings 62 and 64 of the rear wall 65 of bumper beam 14.

Figure 5:
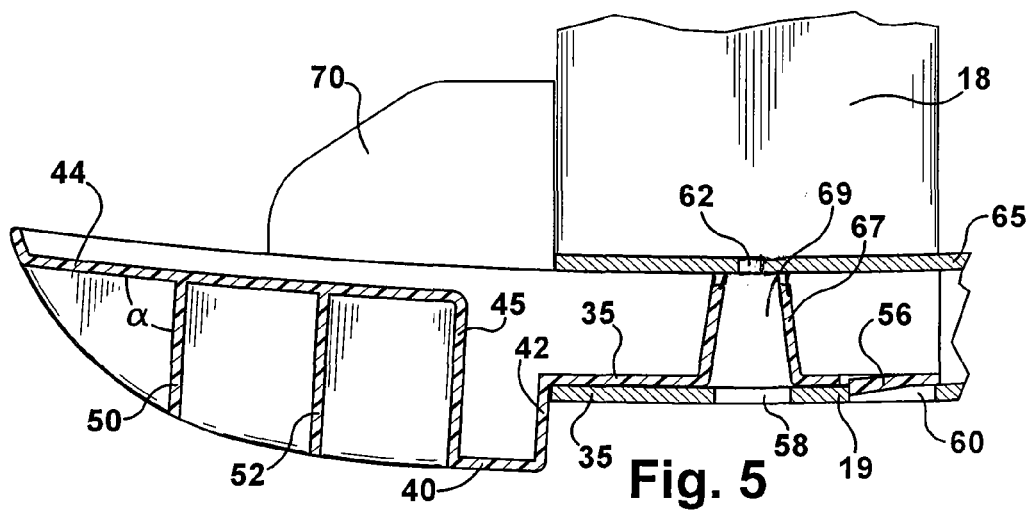
FIG. 5 is a cross-sectional view taken along lines 5-5 of the corner energy absorber of FIG. 4, according to an embodiment of the present invention.

FIG. 5 is a cross-sectional view taken along lines 5-5 of FIG. 4. FIG. 5 shows corner energy absorber mounted to side rail 18 (FIG. 1) for example. Opening 58 aligns with opening 62 of the rear wall 65 of bumper beam. Front wall 35 of arm portion 34 can extend rearward to form a funnel guide 67 which can be useful to position a fastener or bolt through the clearance hole 58 and through channel 69. Funnel guide 67 is an attachment feature of corner energy absorber which can be used to positively locate opening 62 of the bumper beam. The cross sectional view also shows the flex tab 56 in its natural relaxed position which create an interference fit against front wall 19 of the bumper beam. Body portion 32 of corner energy absorber can optionally include wall 42 which extends forward of bumper beam 14. As can be seen in FIG. 4, wall 42 can also extend below the bumper beam. The cross sectional view also shows ribs 50 and 52 which extend from rear wall 44 to front wall 40, although as mentioned above, ribs may be oriented in two or more directions.

The ribs 50 and 52 as shown are substantially parallel to one another, however, they may be directed at various angles relative to one another which can result in different stiffness impact characteristics. For example, by changing the walls to be more upright, the crush member is stiffer. Also positioning walls closer together results in increasing the stiffness of the crush members. By varying at least the wall angles, the spacing of the walls, and the spacing of ribs, crush members are tunable to provide a selected stiffness. Since vehicles have different weights and operating applications, such as commercial, passenger and noncommercial passenger, the bumper can be tuned for a particular vehicle weight and application. For example, corner rib 50 is oriented at an angle alpha, $\alpha$, relative to rear wall 44. The size of the angle alpha can vary and can be less than 180°, and in another example, can vary from about 45° to about 135°, or substantially 90° as shown. The cross-sectional view FIG. 5 also shows that the corner energy absorber can also include a reinforcement structure 70 that extends outward from the rear wall 44, for example to buttress corner energy absorber between rear wall 44 and the side rail. Reinforcement structure 70 can also provide additional support to the corner energy absorber upon impact.

Figure 6:
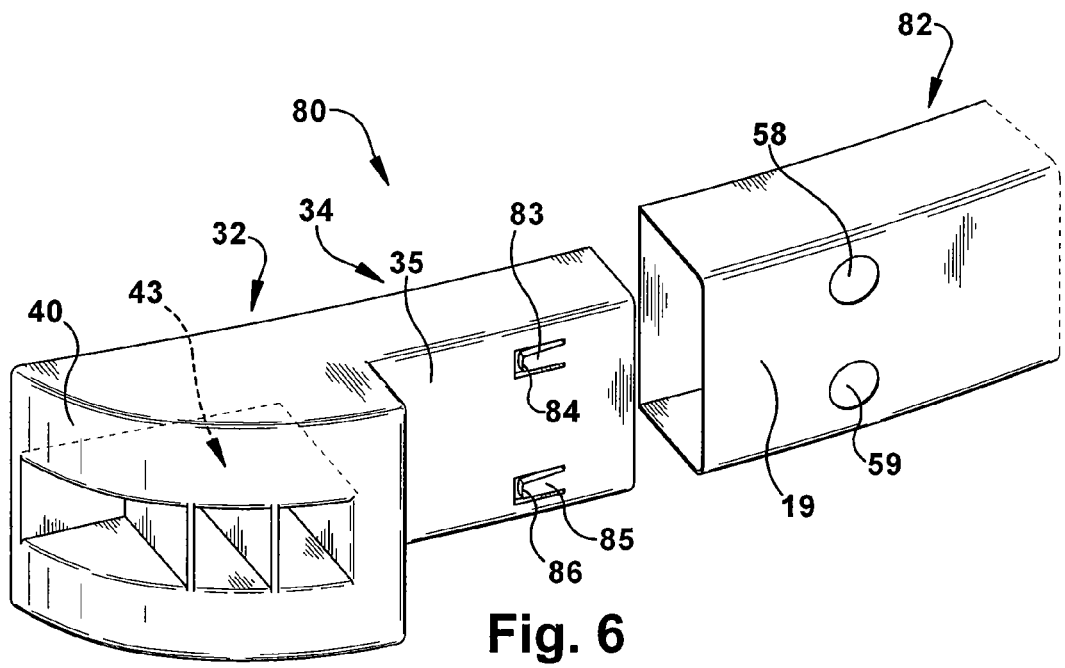
FIG. 6 is a corner energy absorber showing an alternative attachment feature of an arm portion and a bumper beam, according to an embodiment of the present invention.

FIG. 6 is a perspective view of a corner energy absorber 80 illustrating an alternative connection feature for connection to bumper beam 82, according to an embodiment of the present invention. When the corner energy absorber is inserted into the end of the D-section bumper beam 82, the flex tabs 83 and 85 protrude outwards through openings 58 and 59 of the bumper beam such that the edges 84 and 86 of tabs 84 and 85 rest against curved edges of openings 58 and 59. The edges 84 and 86 of flex tabs 83 and 85 can have a curved surface to better conform to the shape of the clearance holes 58 and 59.

Figure 7:
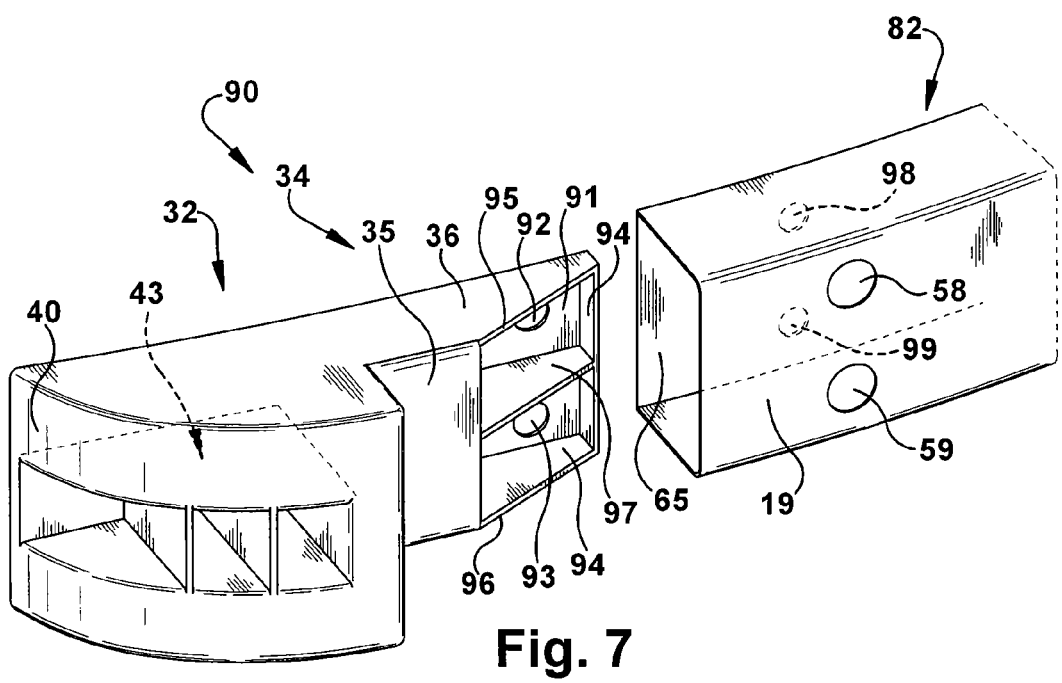
FIG. 7 is a perspective schematic diagram of a corner energy absorber having a arm portion having attachment features on a rear wall and a bumper beam, according to an alternative embodiment of the present invention.

FIG. 7 is a perspective view of a corner energy absorber 90 having an arm portion 34 that has a chamfer edge. In this embodiment, arm portion 34 has a front wall 35 that is at least partially open to expose rear wall 91. The edges 95 and 96 of top surface 36 and bottom surface 94 are tapered to allow easy insertion of the corner energy absorber into the bumper beam 82. When the arm portion is inserted into the bumper beam 82, clearance holes 92 and 93 of the corner energy absorber align with the clearance holes 58 and 59 of the front wall 19 and also clearance holes 98 and 99 of the rear wall 65 of the bumper beam. In this embodiment the corner energy absorber 90 is inserted into the end of the D-section bumper beam 82 and held together using the same clearance holes which are used to hold the bumper beam to the body of the vehicle. Corner energy absorber can optionally include rib 97 of the arm portion to provide additional reinforcement of the bumper beam and protection between front wall 35 and end wall 94.

FIG. 8 is a perspective view of a corner energy absorber 100 having a plurality of channels 102, 104, and 106 that fit into a C-shaped bumper beam 102. The corner energy absorber 100 is inserted into the end 108 of the C-section bumper beam and attached using a snap fit feature, for example flex tabs 56 and 57 which extend through openings 60 and 61 of bumper beam 102. Clearance holes 58 and 59 can be used for mounting the bumper beam 102 to the side rails of the vehicle. In this embodiment, the front wall 40 of corner energy absorber 100 is flush with front wall 106 of end portion 34. Also channel 104 of the arm portion is recessed relative to channels 102 and 106 such that channel 104 can slide through the C-shape opening of rear wall 65 of bumper beam 102.

FIG. 9 is a perspective view of a corner energy absorber 110 of an elongated body portion 32 and an arm portion 34 which can be inserted into bumper beam 112 without the use of fasteners. A plurality of ridges 130 and 132 of arm portion 34 provide for an interference fit against top wall 140 and bottom wall 142 of bumper beam 112. Corner energy absorber 110 includes crush member 120 that extends between front wall 116 and 118. Crush 120 includes top wall 122 and bottom wall 124 which extend from rear wall 126. It includes a plurality of ribs 127 and 128. When chamfered end of bumper beam 112 receives arm portion 34 of corner energy absorber 110 front wall 19 of bumper beam rests against angled surface 136 of corner energy absorber. The body portion 32 can extend slightly forward of bumper beam 112.

FIG. 10 is a perspective view of a corner energy absorber 157 a body portion which provides integrated attachment features. For example, body portion 32 includes crush member 152 that is shaped to receive a lighting fixture, for example, and serves as a housing with integrated support features for securing the lamp to the corner energy absorber. Crush member 152 is defined by rear wall 154 and side wall 156 and a bottom surface which is defined by planar surfaces 160, 162 and curved surfaces 164.

As described in the example embodiments above, arm portion 34 of corner energy absorber 150 can be connected by flex tabs 156 and 157 which are received by openings 60 and 61 in bumper beam 14. The bumper beam can be attached to the side rail through clearance holes 58 and 59 that align with clearance holes 54 and 55. Rear wall 154 can include opening 155 for connection of another component, for example a fixture for a fog lamp. The corner energy absorber 150 can be snapped through the bumper beam as part of an assembly for or after the bumper beam 14 is attached to vehicle.

The corner energy absorber of any of the embodiments described above is also tunable by the selection of the polymer (e.g., thermoplastic resin) that is used. The resin employed may be a low modulus, medium modulus or high modulus material as needed. By carefully considering each of these variables, energy absorbers meeting the selected energy impact objectives can be manufactured. The characteristics of the material utilized to form the energy absorber include high toughness/ductility, thermally stable, high energy absorption capacity, a good modulus-to-elongation ratio and recyclability, among others.

While the energy absorber may be molded in segments, it is beneficial that it be of unitary construction made from a tough plastic material. Materials which are useful for molding the energy absorber include engineering thermoplastic resins. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide, blends of polycarbonate/PET/PBT, polybutylene terephthalate, polyamides, phenylene sulfide resins, polyvinyl chloride PVC, high impact polystyrene (HIPS), low/high density polyethylene (LDPE, HDPE), polypropylene (PP) and thermoplastic olefins (TPO), and blends thereof.

While embodiments of the invention have been described, it would be understood by those skilled in the art that various changes may be made and equivalence may be substituted for the energy absorber or system thereof without departing from the scope of the invention. For example, although example embodiments discussed above pertain to specific attachment features additional attachment features are contemplated. In addition, many modifications may be made to adapt a particular situation of material to the teachings of the invention without departing from the essential scope thereof. For example, the various features of the body portion such as the variety of crush members can be combined with various designs and attachment features of the arm portion shown throughout the various examples. Therefore, it is intended that the invention not be limited to particular embodiments, but that the invention will include all embodiments falling within the scope of the pending claims.

We claim:

1. A corner energy absorber comprising:
    a body portion comprising a top surface, a bottom surface and a front wall which extends between the top surface and the bottom surface;
    an arm portion extending from the body portion, wherein the arm portion has a size and geometry to be received within an end of a bumper beam; and
    a crush member extending from the front wall of the body portion and disposed between the top surface and the bottom surface.

2. The corner energy absorber of claim 1, wherein the front wall of the body portion is curved.

3. The corner energy absorber of claim 1, wherein the front wall of the body portion comprises an opening.

4. The corner energy absorber of claim 1, wherein the crush member comprises:
    at least one of a top wall, a bottom wall, and a rear wall which extend from the front wall of the body portion; and a rib.

5. The corner energy absorber of claim 4, wherein:
    the crush member comprises a rear wall, a top wall and a bottom wall; and
    wherein the rib extends longitudinally between the top wall and bottom wall of the crush member.

6. The corner energy absorber of claim 1, wherein the arm portion comprises an opening for attachment to the bumper beam.

7. The corner energy absorber of claim 1, wherein the arm portion comprises a flex tab for attachment to the bumper beam.

8. The corner energy absorber of claim 1, wherein the arm portion comprises a protrusion of the arm portion for attachment to the bumper beam.

9. The corner energy absorber of claim 1, wherein the arm portion comprises a plurality of channels.

10. The corner energy absorber of claim 1, wherein the body portion comprises a rear wall and a reinforcement structure which extends outward from the rear wall.

11. The corner energy absorber of claim 1, wherein the corner energy absorber comprises a polymer selected from the group of: acrylonitrile-butadiene-styrene, polycarbonate, polyester, acrylic-styrene-acrylonitrile, acrylonitrile-(ethylene-polypropylene diamine modified)-styrene, phenylene ether resins, polyamide, polybutylene terephthalate, polyamides, phenylene sulfide resins, polyvinyl chloride, thermoplastic olefin, and blends thereof.

12. A bumper system comprising:
   a bumper beam; and
   a corner energy absorber comprising
      a body portion comprising a top surface, a bottom surface and a front wall which extends between the top surface and the bottom surface;
      an arm portion extending from the body portion into an end of the bumper beam; and
      a crush member extending from the front wall of the body portion and disposed between the top surface and the bottom surface;
   wherein the corner energy absorber extends from the end of the bumper beam.

13. The bumper system of claim 12, wherein the arm portion of the corner energy absorber comprises a member attachment feature that is attached to a bumper beam attachment feature.

14. The bumper system claim 13, wherein the member attachment feature and the bumper beam attachment feature comprise a hole and funnel guide.

15. The bumper system claim 13, wherein the member attachment feature and the bumper beam attachment feature comprise a snap fit.

16. The bumper system claim 13, wherein the member attachment feature comprises a chamfer edge.

17. The bumper system claim 12, wherein the crush member comprises a rib that extends between a top wall and a bottom wall of the crush member.

18. The bumper system claim 12, wherein at least one of a top wall and a bottom wall of the crush member comprises a surface which is at least partially curved.

19. The bumper system claim 12, wherein the corner energy absorber comprises a polymer.

20. The bumper system claim 12, wherein the bumper beam comprises a material selected from the group consisting of steel and aluminum.

21. The bumper system claim 12, wherein the corner energy absorber comprises a polymer and the bumper beam comprises a material selected from the group consisting of steel and aluminum.

* * * * *